United States Patent [19]
Ueno et al.

[11] Patent Number: 5,058,090
[45] Date of Patent: Oct. 15, 1991

[54] MAGAZINE LOADING DISK PLAYER

[75] Inventors: Hitoshi Ueno; Keiichi Takagi, both of Saitama, Japan

[73] Assignee: Pioneer Electronic Corporation, Tokyo, Japan

[21] Appl. No.: 503,644

[22] Filed: Apr. 3, 1990

[30] Foreign Application Priority Data

Sep. 11, 1989 [JP] Japan .................. 1-234946

[51] Int. Cl.[5] .................. G11B 17/22
[52] U.S. Cl. .................. 369/36; 369/34; 369/38; 369/39
[58] Field of Search .................. 369/36, 38, 191, 192, 369/75.2, 270, 34, 39, 194

[56] References Cited

U.S. PATENT DOCUMENTS

| 2,496,056 | 1/1950 | Lannerd | 369/192 X |
| 2,644,565 | 7/1953 | Ebert | 369/36 X |
| 4,737,945 | 4/1988 | Yamazaki et al. | 369/270 X |
| 4,809,252 | 2/1989 | Ikedo et al. | 369/36 X |
| 4,893,295 | 1/1990 | Matsuura et al. | 369/75.2 |

FOREIGN PATENT DOCUMENTS

| 0230665 | 10/1986 | Japan | 369/36 |
| 61-261853 | 11/1986 | Japan . | |
| 0154359 | 6/1989 | Japan | 369/191 |

Primary Examiner—Stuart S. Levy
Assistant Examiner—Tien Ba Pham
Attorney, Agent, or Firm—Sughrue, Mion, Zinn, Macpeak & Seas

[57] ABSTRACT

A magazine loading type disk player comprises a magazine mount portion for removably mounting a magazine. The magazine includes a housing and a plurality of plate-like trays for carrying respective disks. The plate-like trays are capable of being projected from and retracted into the housing. The disk player further comprises a pickup and a turntable supported on a supporting member so as to be movable in a direction of the arrangement of the trays for receiving a selected one of the disks from the magazine; a positioning mechanism for positioning the supporting member which carries the pickup and turntable; and a disk moving mechanism for feeding the selected disk from the magazine to the turntable after positioning of the support member, and for retracting the selected disk. The positioning mechanism includes a pair of cross-links for movably supporting the supporting member, and a link driving mechanism for moving the cross-links. Each of the cross-links has a fixed pivot side link and a movable pivot side link pivoted to each other through a pin. The fixed pivot side link of one of the cross-links has a sector gear provided at the free or pivoted end. The link driving mechanism transmits movement to the sector gear to swing the fixed pivot side link.

4 Claims, 7 Drawing Sheets

MAGAZINE LOADING DISK PLAYER

FIELD OF THE INVENTION

The present invention relates to a disk player and, in particular, relates to a magazine loading disk player in which a plurality of disks can be accommodated and the plurality of disks thus accommodated can be selected as desired so as to be subject to successive playing.

BACKGROUND OF THE INVENTION

A magazine loading type disk player is known, for example, in Japanese Patent Unexamined Publication No. 61-261853. This type of disk player has: a playing means including a turntable and a pickup; and a magazine mount portion for removably mounting a magazine which acts as a disk accommodating portion and which includes a housing and a plurality of plate-like trays for carrying disks on the main surfaces thereof, respectively. The plate-like trays are arranged within the housing so as to be capable of being projected from and retracted into the housing. In such a magazine loading disk player, a selected one of the disks is conveyed from the magazine to the turntable by moving the disk in the following two directions; a direction parallel to the disk-carrying surface of the turntable and a direction perpendicular thereto. More specifically, the trays are arranged in the magazine in the direction perpendicular to the disk-carrying surface of the turntable. The playing means, including the turntable, is mounted on a predetermined supporting member, and the supporting member is driven to reciprocate in the direction of arrangement of the trays instead of movement of the disks in the direction perpendicular to the disk-carrying surface of the turntable. On the other hand, the movement of the disks in the direction parallel to the disk-carrying surface of the turntable is carried out by projecting the tray, carrying the desired disk, from the magazine.

Various proposals have been made on means for moving the playing means, together with the supporting member supporting the playing means, in the direction of arrangement of the trays as described above. One of the proposals is disclosed in Japanese Patent Unexamined Publication No. 61-261853. The proposal suggests a configuration in which a flat plate-like cam body, which is provided with a stepping cam portion slidably engaged with the supporting member, is driven to reciprocate. In the aforementioned configuration, the cam portion is shaped like steps. Accordingly, there arises a problem in that the supporting member supporting the playing means intermittently operates rapidly to thereby generate a relatively large amount of noise in operation. Further, a large space is required for making such a large flat plate-like cam body reciprocate. Accordingly, there arises a problem to be solved for the purpose of reducing the overall size of the entire player.

On the other hand, the following configuration has been used widely, in which a feed screw is provided so as to be extended in the direction of arrangement of the trays and the supporting member, carrying the playing means, is fastened to the feed screw. With such a configuration, the playing means is moved in the direction of arrangement of the trays through rotation of the feed screw. However, the driving operation utilizing such a feed screw is so slow in operational speed that there arises a problem in that the speed in the disk conveying operation cannot be improved. Further, the frictional force of the feed screw is so large that a high load is imposed. Accordingly, there arises a problem in that a driving source having a large output power is required.

To avoid the problems caused by use of the above-mentioned cam body and feed screw, the following configuration has been proposed as disclosed in Japanese Patent Application Nos. 63-193371 and 1-184658. That is, the playing means is supported by cross-links so that the playing means is moved in the direction of arrangement of the trays by the operation of the cross-links.

SUMMARY OF THE INVENTION

An object of the present invention is to provide a magazine loading disk player in which the playing means can be moved in the direction of arrangement of the disks by the operation of the aforementioned cross-links and, in particular, in which a reduction in size of the entire player is attained.

The magazine loading disk player according to the present invention comprises: a magazine mount portion for removably mounting a magazine, the magazine including a housing and a plurality of plate-like trays for carrying disks on the main surfaces thereof, respectively, the plate-like trays being arranged within the housing so as to be capable of being projected from and retracted into the housing. The player further includes a playing means provided so as to be movable in the direction of arrangement of the trays for receiving a selected one of the disks from the magazine and for playing the selected disk; a positioning means for performing positioning of the playing means; a disk moving means for feeding the selected disk from the magazine to the playing means after the positioning of the playing means and for accommodating the selected disk into the magazine after the playing of the disk. The positioning means includes cross-links for movably supporting the playing means through a supporting member, and a link driving means for giving a moment to the cross-links. The cross-links have a sector gear provided at a swingable end side, with respect to a cross point, of a fixed pivot side link of the cross-links, whereby the link driving means transmits a moment to the sector gear through a rotary gear engaged with the sector gear to thereby make the fixed pivot side link swing.

In the aforementioned configuration of the present invention, a driving force from a driving source such as a motor, or the like, is applied to the swing end portion of the fixed pivot side link through the aforementioned rotary gear.

DETAILED DESCRIPTION OF THE PREFERRED EMBODIMENTS

The magazine loading disk player according to an embodiment of the present invention will be described hereunder with reference to the accompanying drawings.

Figure 1:
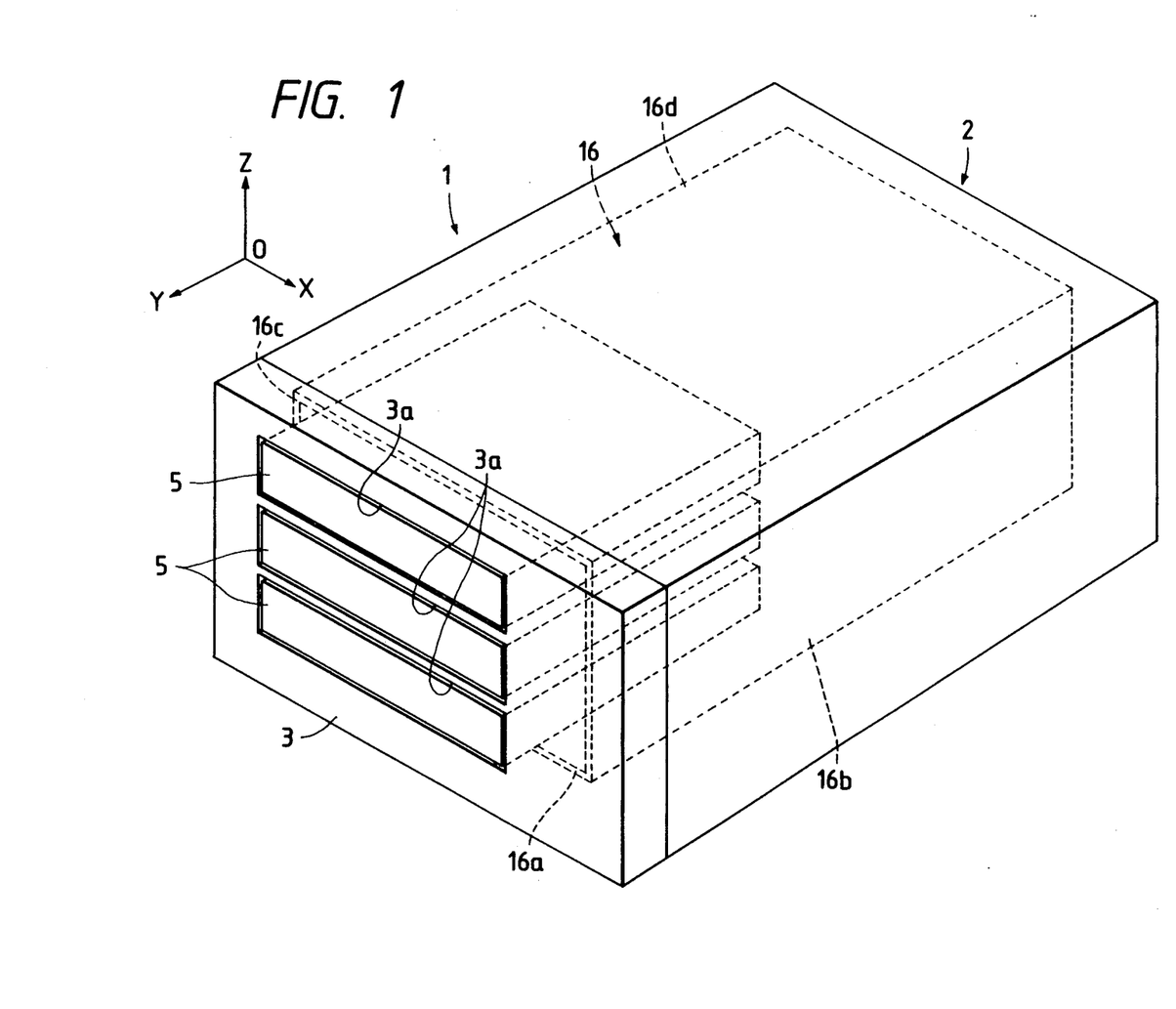
FIG. 1 is a perspective view of a magazine loading disk player according to an embodiment of the present invention.

In FIG. 1, the reference numeral 1 designates the entire magazine loading disk player.

As shown in FIG. 1, a front panel 3 of a player housing 2 is provided with three oblong opening portions 3a vertically arranged for loading magazines 5, serving as disk storage portions, into magazine mount portions in the player housing. The magazines 5 are inserted through the opening portions 3a so as to be mounted on the respective magazine mount portions. Each of the opening portions 3a is extended in the left/right direction. With respect to the left/right direction and as viewed from the origin O, the arrow X represents the left direction; the arrow Y represents the front direction; and the arrow Z represents the upward direction.

Figure 2A:
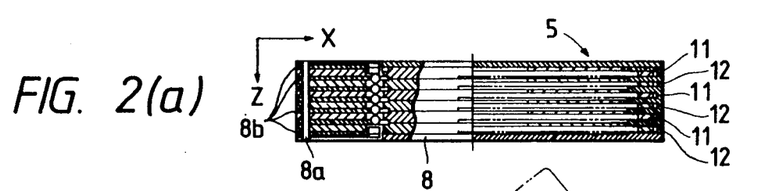
FIGS. 2(a)-2(c) are longitudinal sectional, plan and side views, respectively, of a magazine to be loaded into the magazine loading disk player depicted in FIG. 1.
Figure 2B:
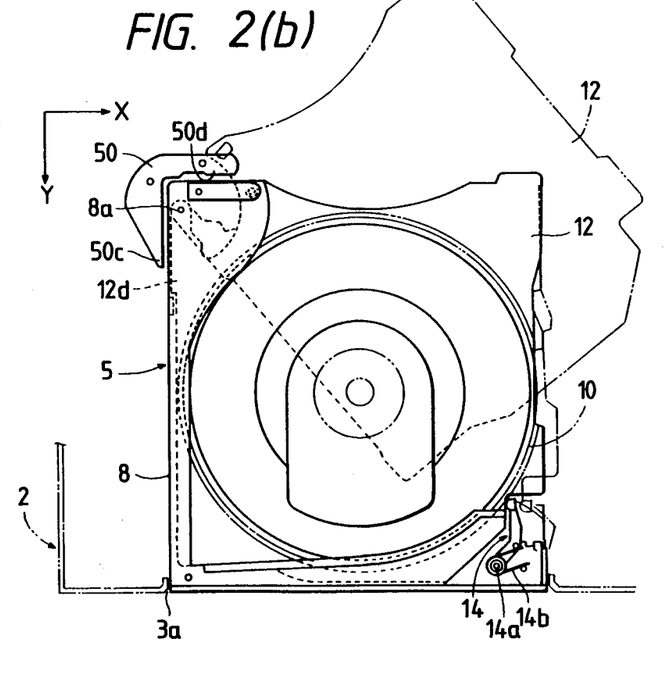
Figure 2C:
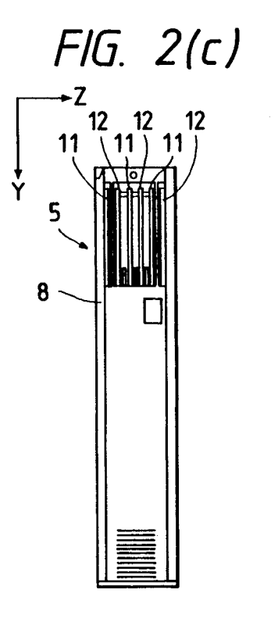

As shown in FIGS. 2(a)-(c), each of the magazines 5 has a magazine body 8, which is generally shaped like a flat rectangular parallelepiped so as to act as a housing, and three pairs, six in total, of rectangular plate-like trays, each pair including a tray 11 and a tray 12 each for carrying a disk 10 on its main surface. The trays 11 and the trays 12, and hence the disks 10, are arranged in order at intervals of a predetermined pitch in directions perpendicular to the disk-carrying surface of a turntable which will be described later, (i.e., in the up/down directions or the Z-direction and the direction opposite thereto). The trays 11 and the trays 12 are provided on a rotation support shaft 8a so as to be rotatable about the rotation support shaft 8a which is provided at the right rear end portion of the magazine body 8 so as to extend in the directions of arrangement of the trays (up/down directions), so that the trays can be projected from and accommodated within the magazine body 8 along the respective main surfaces thereof.

The magazine body 8 is provided with seven partitions 8b arranged in the up/down directions (the Z-direction and the direction opposite thereto) so that each of the trays 11 and the trays 12 is interposed between two adjacent partitions.

As shown in FIG. 2(b), a press lever 14 extending in the front/rear portions (the Y direction and the direction opposite thereto) is provided in the left front end portion of the magazine body 8. In this embodiment, one end portion (front end portion) of the press lever 14 is pivoted to the magazine body 8 through a pin 14a extending in the up/down directions (the Z-direction and the direction opposite thereto). The other end portion (rear end portion) of the press lever 14 is capable of being smoothly engaged with the free end portions of the trays 11 and 12. The press lever 14 is provided with a spring member 14b which serves to urge the press lever 14 counterclockwise in FIG. 2(b) so that the spring member 14b gives a tray-pressing force to the press lever 14.

The magazine 5 is described in detail, for example, in Japanese Patent Unexamined Publication No. 61-261853 and therefore the magazine will not be described any more in detail.

As shown in FIG. 1 and FIGS. 3-5, a chassis 16 having a shape like rectangular parallelepiped is provided in the player housing 2. The chassis 16 is constituted by a rectangular plate-like bottom portion 16a, rectangular plate-like supporting portions 16b and 16c which are connected to the bottom portion 16a and extend upward at opposite sides, and a rectangular plate-like frame portion 16d, as a top portion, which is connected to the two supporting portions so as to extend therebetween and so as to be in opposition to the bottom portion 16a.

Figure 3:
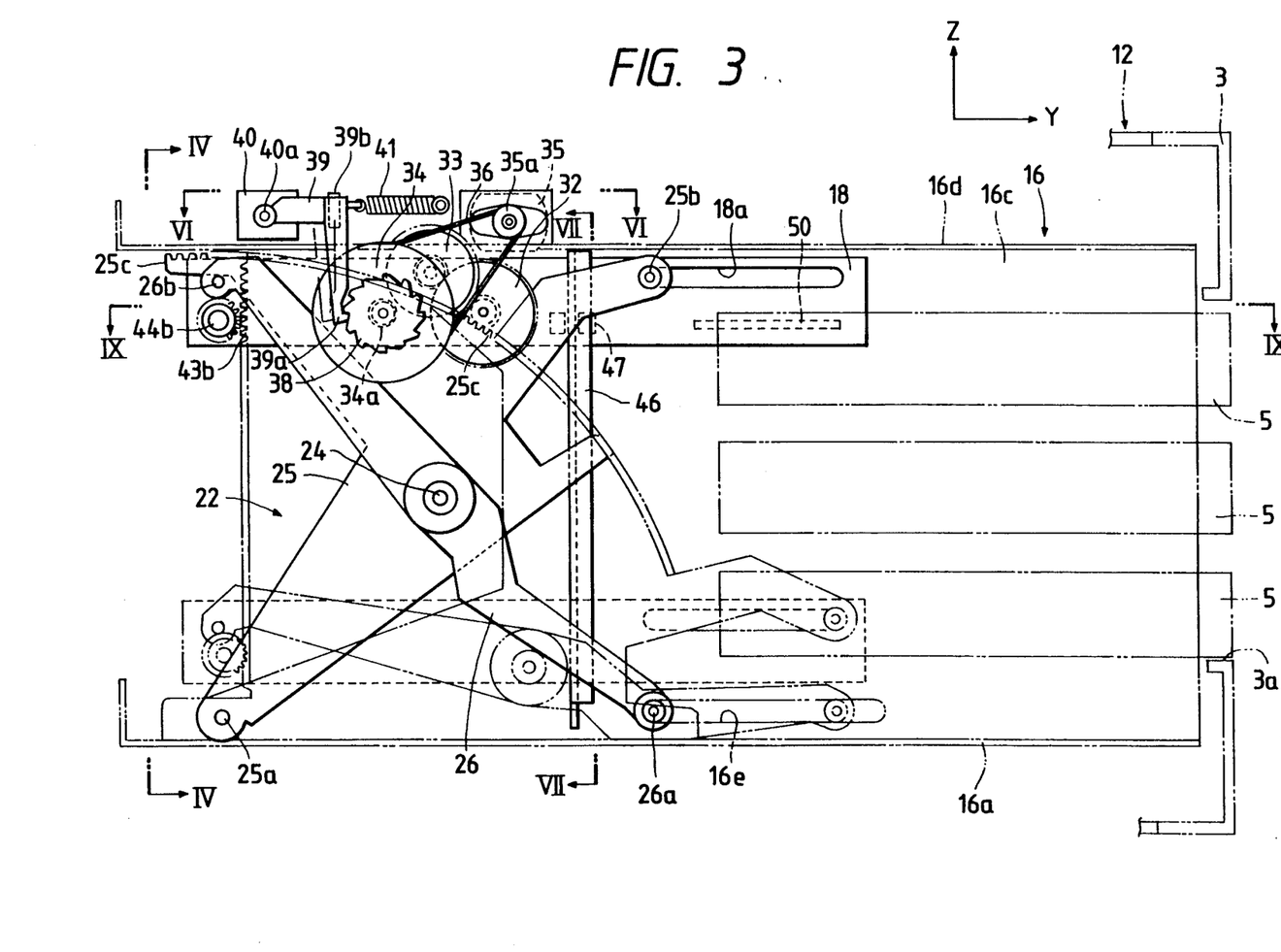
FIGS. 3-5 are right side, rear elevational and left side views, respectively, showing the inside structure of the magazine loading disk player depicted in FIG. 1.
Figure 4:
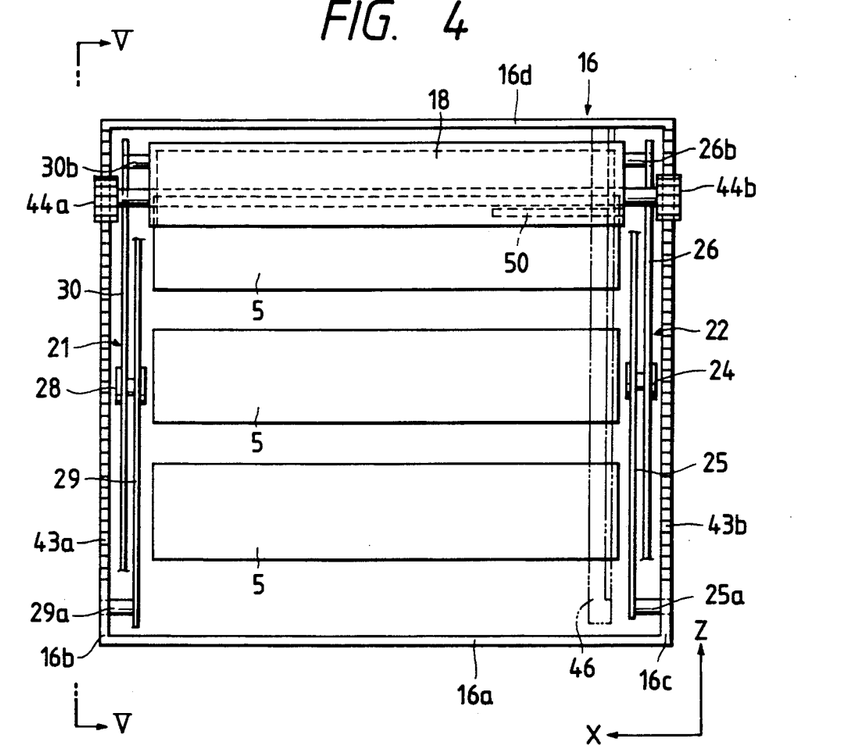
Figure 5:
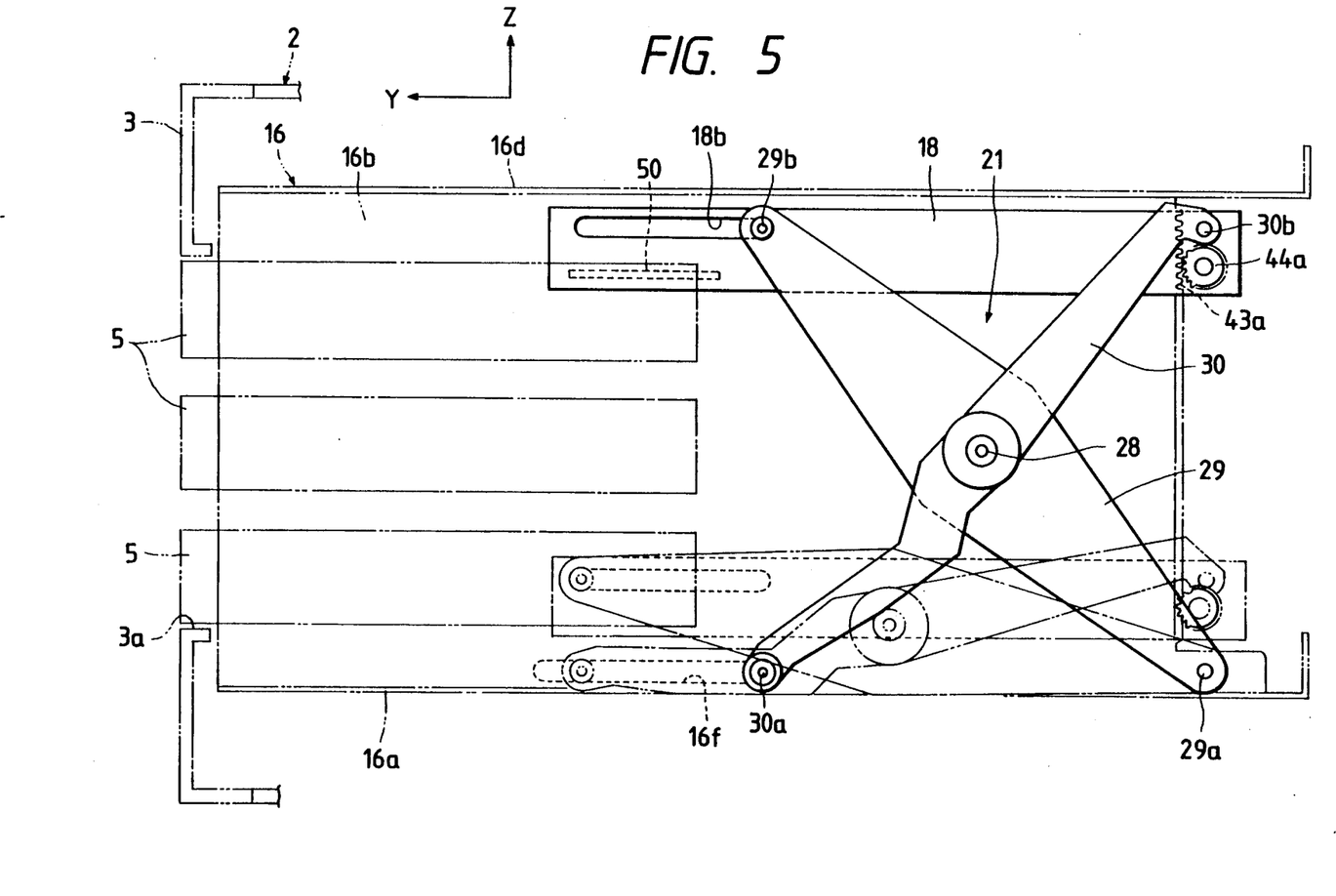

As shown in FIGS. 3-5, a generally rectangularly shaped supporting member 18 is arranged between the supporting portions 16b and 16c of the chassis 16 so as to be opposite to the bottom portion 16a and the frame portion 16d. A playing means (not shown) including a turntable and a pickup and receiving a disk 10 from a magazine 5 in order to play the disk, a disk moving means for feeding the disk from the magazine 5 to the playing means and for moving the disk into the magazine 5 after the playing, and a disk clamping mechanism (not shown) for clamping the disk carried on the turntable are mounted on the supporting member 18. The playing means and the disk moving means are described, for example, in detail in Japanese Patent Unexamined Publication No. 61-261853 or the like. Accordingly, these means will not be described any more in detail except for a portion which will be described later.

A pair of cross-links 21 and 22 are provided in the chassis 16 so that the supporting member 18 is disposed between the cross-links. The supporting member 18 is supported by the cross-links 21 and 22 so as to be movable in the up/down directions, that is to say, in the directions of arrangement of the trays 11 and the trays 12 within each magazine 5.

As shown in FIG. 3, the cross-link 22 for supporting the right end portion of the supporting member 18 is constituted by a fixed pivot side link 25 and a movable pivot side link 26 pivoted to each other through a pin 24. In this embodiment, one end portion (lower end portion) of the fixed pivot side link 25 is pivoted to the lower portion of the supporting portion 16c of the chassis 16 through a pin 25a (see FIG. 4). The other end portion (upper end portion) of the fixed pivot side link 25 is engaged, through a pin 25b, with a slot 18a provided in the right side front end portion of the supporting member 18 and extending in the front/rear directions, so that the end portion of the fixed pivot side link 25 is slidable in the slot. One end portion (lower end portion) of the movable pivot side link 26 is engaged, through a pin 26a, with a slot 16e provided in the lower portion of the supporting portion 16c of the chassis 16 and extending in the front/rear directions, so that the end portion of the movable pivot side link 26 is slidable in the slot. The other end portion (upper end portion) of the movable pivot side link 26 is pivoted to the right side rear end portion of the supporting member 18 through a pin 26b.

On the other hand, as shown in FIG. 5, the cross-link 21 for supporting the left end portion of the supporting member 18 is constituted by a fixed pivot side link 26 and a movable pivot side link 30 pivoted to each other through a pin 28. One end portion (lower end portion) of the fixed pivot side link 29 is pivoted to the lower portion of the supporting portion 16b of the chassis 16 through a pin 29a. The other end portion (upper end portion) of the fixed pivot side link 29 is engaged, through a pin 29b, with a slot 18b provided in the left side front end portion of the supporting member 18 and extending in the front/rear directions, so that the end portion of the fixed pivot side link 29 is slidable in the slot. One end portion (lower end portion) of the movable pivot side link 30 is engaged, through a pin 30a, with a slot 16f provided in the lower portion of the supporting portion 16b of the chassis 16 and extending in the front/rear directions, so that the end portion of the movable pivot side link 30 is slidable in the slot. The other end portion (upper end portion) of the movable pivot side link 30 is pivoted to the left side rear end portion of the supporting member 18 through a pin 30b.

As shown in FIG. 3, an arcuate sector gear 25c is integrally formed at a swingable end side of the fixed pivot side link 25 of the cross-link 22, the center of curvature of the arcuate sector gear 25c being formed at the pin 25a which serves as a pivotal center of the fixed pivot side link 25. The sector gear 25c is engaged with a small gear portion of a double gear 32 constituted by a large gear and a small gear integrally and concentrically formed with each other. A large gear portion of the double gear 32 is engaged with a small gear portion of another double gear 33. A large gear portion of the double gear 33 is engaged with a gear 34a formed concentrically and integrally on a large-diameter toothed belt wheel 34. A motor 35 is arranged above the double gear 32. A toothed belt 36 is entrained between a small-diameter belt wheel 35a mounted on the power shaft of the motor 35 and the large-diameter belt wheel 34. These double gears 32 and 33, the toothed belt wheels 34 and 35a and the motor 35 are supported by a sub-chassis (not shown) attached to the frame portion 16d of the chassis 16.

The aforementioned double gears 32 and 33, the toothed belt wheels 34 and 35a, the toothed belt 36, the gear 34a and the motor 35 constitute a link driving means for giving a moment to the cross-links 21 and 22. In short, the double gear 32 is rotated by the rotation of the motor 35 in the forward and reverse directions, by which the fixed pivot side link 25 of the cross-link 22 is driven to swing to operate the cross-links 21 and 22, so that the supporting member 18 reciprocates in the direction of arrangement of the trays in each magazine 5. Because the link mechanism is formed such that a moment is given to the swingable end portion of the fixed pivot side link 25, a large moment can be given to the cross-links even though the output power of the motor is small. Accordingly, the size of the motor can be reduced.

The aforementioned cross-links 21 and 22 and the link driving means constitute a positioning means for positioning the playing means together with the supporting member 18 mounting the playing means thereon, in the direction of arrangement of the trays.

As shown in FIGS. 3–6, the toothed belt wheel 34 serving as a constituent member of a motive power transmission mechanism for transmitting motive power from the motor 35 to the cross-links is provided with a ratchet 38 formed integrally and concentrically with the wheel 34. A select lever 39 having a pawl 39a at its one end is provided so that the pawl 39a is capable of being engaged with the ratchet 38. The select lever 39 is pivoted, at its middle portion, to the frame portion 16d of the chassis 16 through a pin 39b. The opposite end portion of the select lever 39 is connected to the power shaft 40a of a solenoid plunger 40 so that the pawl 39a of the select lever 39 is disengaged from the ratchet 38 when the power shaft 40a is pulled upon actuation of the solenoid plunger 40. The free end portion of the select lever 39 is connected to a coiled spring 41 for urging the select lever 39 so as to cause the pawl 39a of the select lever 39 to engage with the ratchet 38.

The aforementioned ratchet 38 and the select lever 39 including the pawl 39a constitute a ratchet mechanism. The solenoid plunger 40 and the coiled spring 41 serve to selectively operate the ratchet mechanism. In the aforementioned configuration, the rotating member, that is, the toothed belt wheel 34, is stopped at a predetermined angular position by the engagement of the ratchet 38 with the pawl 39a in the ratchet mechanism, so that the playing means moved in the direction of arrangement of the trays by the operation of the cross-links 21 and 22 can be positioned accurately in a position corresponding to each tray in the magazine 5.

As shown in FIGS. 3–5, a pair of interlocking rack portions 43a and 43b parallel with each other along the direction of movement of the supporting member 18, carrying the playing means, are formed at the rear end portions of the left and right supporting portions 16b and 16c of the chassis 16. The rack portions 43a and 43b are engaged with a pair of pinions 44a and 44b which are provided in the rear end portion of the supporting member 18 so as to be concentric with each other. By provision of the interlocking means, the left and right cross-links 21 and 22 can be operated very exactly in synchronism with each other so that the movement of the trays and the positioning of the playing means corresponding to each tray in the magazine 5 can be carried out accurately.

As shown in FIGS. 3, 4, 7 and 8, an address plate 46, having eighteen slits 46a arranged in three sets of six along the movement of the playing means corresponding to the trays in the respective magazines 5, is provided in the rear of the magazine mount piston and fixed to the chassis 16. Photosensors 47 for detecting the slits 46a are mounted on the supporting member 18 supporting the playing means and are provided corresponding to the respective slits 46a of the address plate 46. Slit detection signals obtained by the photosensors 47 are fed to a counter (not shown) for counting the slit detection signals. Further, a control portion (not shown) for performing the operation control of the multi-disk loading player is arranged in a predetermined position in the player housing 2 so that the control portion can determine the stop position of the supporting member 18 from the count value of the counter.

As shown in FIG. 2(b), FIGS. 3–5 and FIG. 9, a tray pressing member 50, which engages with the trays one-by-one in the magazine 5 to thereby push a desired one of the trays out of the magazine 5 and which accommodates the tray into the magazine 5, is provided in the right front end portion of the supporting member 18 mounting the playing means thereon. The tray pressing member 50 is generally L-shaped and has pins 50a and 50b formed thereon so as to project to slidably engage with arcuate guide grooves 18c and 18d formed in the supporting member 18 so that the tray pressing member 50 is guided by this slidable engagement. In short, the tray pressing member 50 rotates (in the direction of the arrow R) with the curvature center of the arcuate guide members 18c and 18d as a rotary axis, so that any one of the trays 11 and the trays 12 is pressed by the end portions 50c and 50d of the tray pressing member 50 to perform projection/retraction of the tray out-of/into the magazine body 8.

Figure 9:
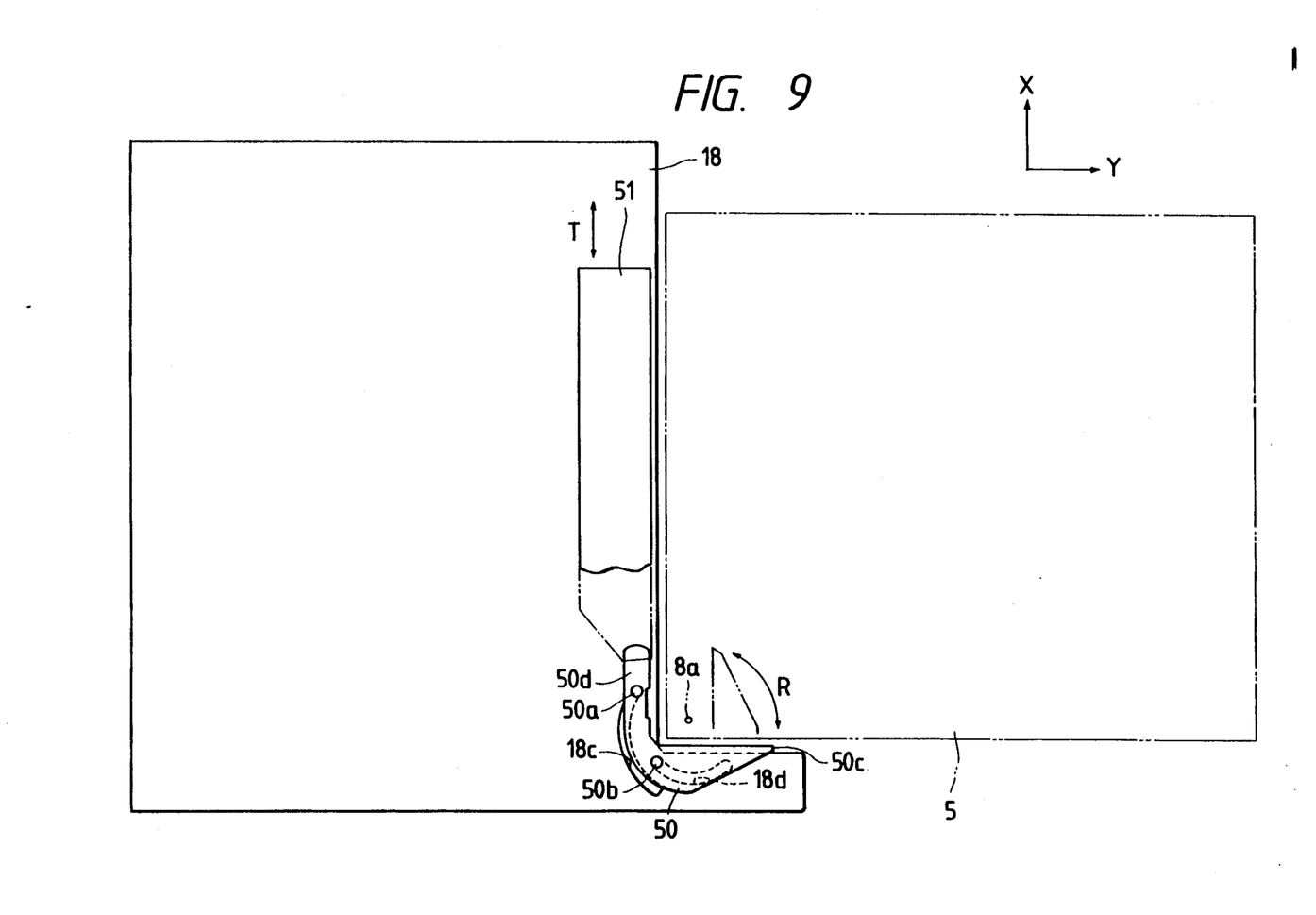
FIG. 9 is a sectional view taken along the line IX—IX in FIG. 3.

As shown in FIG. 9, a lever member 51 capable of reciprocating (in the direction of the arrow T) in the left/right directions is provided on the supporting member 18 and in the vicinity of the tray pressing member 50 and is engaged with the tray pressing member 50 at the right end portion thereof. Though not shown, a driving force application means for giving a driving force to the lever member 51 is provided. The tray pressing member 50 is pivotally moved by the reciprocating motion of the lever member 51 to which driving force is given by the driving force application means.

The aforementioned lever member 51 and the driving force application means for giving driving force to the lever member 51 constitute a tray pressing member driving means for driving the tray pressing member 50 to pivotally move relative to the supporting member 18. The tray pressing member driving means and the tray pressing member 50 constitute a disk moving means for feeding a desired disk from the magazine 5 to the playing means after the positioning of the playing means and for accommodating the disk into the magazine after the playing of the disk. As described above, the disk moving means has been disclosed in detail in the Japanese Patent Unexamined Publication No. 61-261853, and the disk moving means will not be described any further.

As shown in FIG. 4, the tray pressing member 50 for pressing the trays out-of/into the magazine 5 is arranged in the inner side of the cross-links 21 and 22 which are for moving the playing means in the direction of arrangement of the trays. Accordingly, the cross-links 21 and 22 do not interfere with the magazine 5 and other mechanisms, so that the movement of the playing means in the direction of arrangement of the trays and the driving of the tray pressing member 50 can always be carried out smoothly.

In the following, the operation of the magazine loading disk player having the aforementioned configuration is described in brief.

Figure 6:
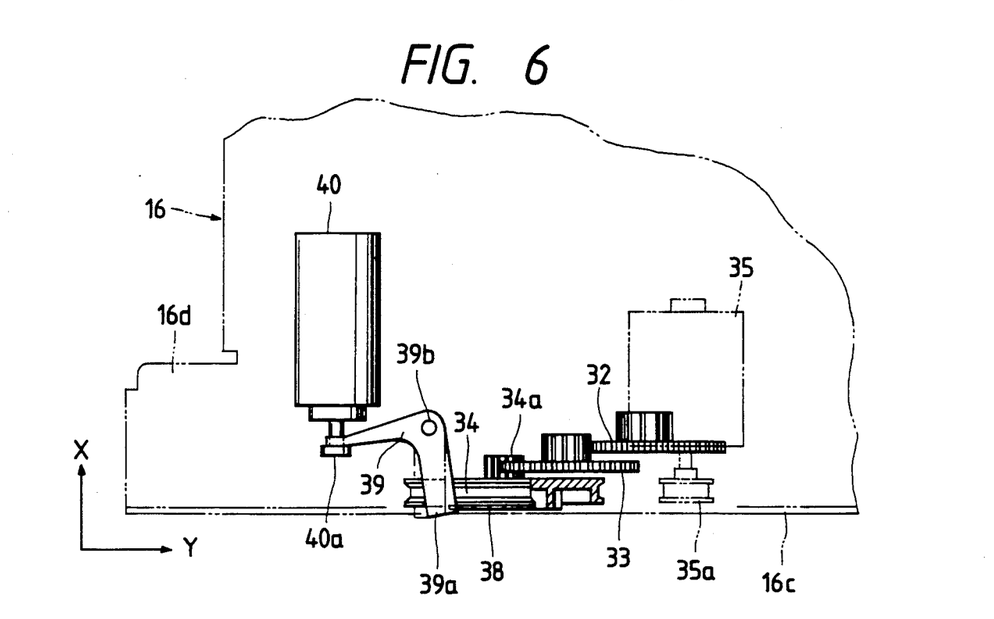
FIG. 6 is a sectional view taken along the line VI—VI in FIG. 3.
Figure 7:
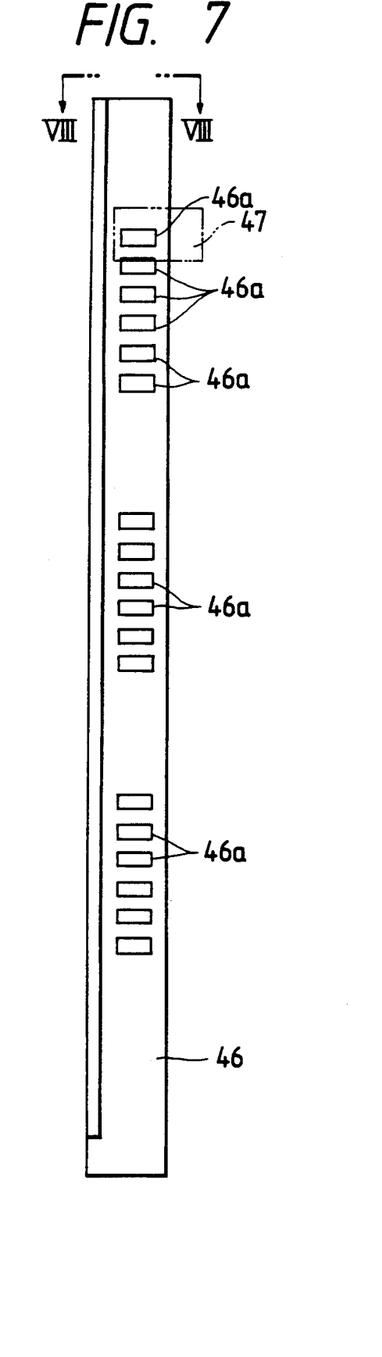
FIG. 7 is a sectional view taken along the line VIII—VIII in FIG. 3.
Figure 8:
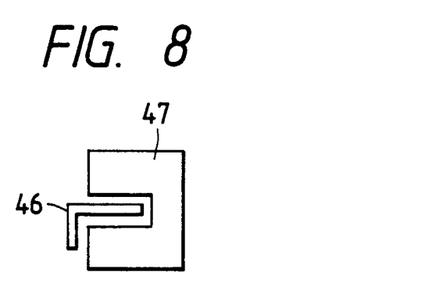
FIG. 8 is a sectional view taken along the line VIII—VIII in FIG. 7.

When an operation portion (not shown) on the front panel 3 of the player housing 2 is actuated to designate a disk to be played, a driving voltage is fed to the motor 35 so that the operation of the left and right cross-links 21 and 22 is started. Accordingly, the supporting member 18, that is, the playing means, moves upward or downward to be positioned in a position corresponding to the disk designated to be played. Accordingly, the tray pressing member 50 provided on the supporting member 18 is positioned in a position in which the tray pressing member is engaged with the tray carrying the disk designated to be played. During the movement of the supporting member 18, the solenoid plunger 40, as shown in FIGS. 3 and 6, is kept in an ON state so that the pawl 39a of the ratchet mechanism is disengaged from the ratchet 38. Accordingly, there is no occurrence of noise in action of the ratchet mechanism during the movement of the supporting member 18. When the positioning of the supporting member 18 is finished, the motor 35 is stopped and, at the same time, the solenoid plunger 40 is turned off. Therefore, the ratchet 38 and the pawl 39a in the ratchet mechanism are engaged with each other by the urging force of the coiled spring 41, so that the playing means carried on the supporting member 18 is positioned accurately in a position corresponding to the tray carrying the disk designated to be played.

Thereafter, the tray pressing member driving means is operated so that the tray pressing member 50 is pivotally moved from a position designed by the solid line in FIG. 9 to a position designated by the two-dot chain line in FIG. 9. Accordingly, as shown in FIG. 2(b), the tray (for example, tray 12) carrying the disk designated to be played is rotated by about 90° so as to project out of the magazine body 8, so that the disk on the tray is mounted onto the playing means and clamped on the turntable.

Thus, the disk is enabled to be played. In short, the turntable rotates and, at the same time, the pickup starts its action, so that the disk playing is started.

When the playing is finished, the disk is accommodated into the magazine 5. The disk accommodation operation is carried out in the reverse course to the aforementioned disk loading operation. Accordingly, the disk storage operation will not be described any further in detail. The aforementioned series of operation is repeated by the number of designated programs.

As described above, in the magazine loading disk player according to the present invention, the sector gear is provided at a swingable end side, with respect to the cross point, of the fixed pivot side link of the cross-link which supports the right side portion of the supporting member carrying the playing means so as to be movable in the direction of arrangement of the trays, whereby the link driving means gives a moment to the cross-link through the rotary gear engaged with the sector gear.

Because of the configuration in which a moment is applied to the swingable end portion of the fixed pivot side link as described above, a large moment can be applied to the cross-link even though the output power of the driving source, such as a motor, is small. Accordingly, the size of the driving source can be reduced so that reduction of the overall size of the entire player can be attained.

In the aforementioned configuration, the fixed pivot side link serves also as a last gear of the motive power transmission mechanism for transmitting driving force from the driving source to the fixed pivot side link. Accordingly, the number of gears constituting the motive power transmission mechanism can be reduced compared with other configurations in which a last gear separate from the fixed pivot side link is provided to be connected to the center of the swinging of the fixed pivot side link. Consequently, the number of parts can be reduced so that reduction of cost can be attained.

Furthermore, in the aforementioned configuration, frictional force produced between the sector gear and the rotary gear engaged with the sector gear is so small that high efficiency of the motive power transmission can be attained.

What is claimed is:

1. A magazine loading disk player comprising:
    a magazine mount portion for removably mounting a magazine, said magazine including a housing and a plurality of plate-like trays for carrying disks on main surfaces thereof, respectively, said plate-like trays being arranged within said housing so as to be projected from and retracted into said housing;
    a playing means provided so as to be movable in a direction of arrangement of said trays for receiving a selected one of said disks from said magazine and for playing said selected disk;
    a supporting member for supporting said playing means;
    a positioning means for performing a positioning of said playing means through said supporting member;
    a disk moving means for feeding said selected disk from said magazine to said playing means after the positioning of said playing means and for retracting said selected disk into said magazine after the playing of said disk;

said positioning means including a pair of cross-links for movably supporting said playing means through said supporting member, each of said cross-links having a fixed pivot side link and a movable pivot side link pivoted to each other through a pin, wherein said fixed pivot side link of at least one of said cross-links has a sector gear provided at a swingable end side thereof, and a link driving means for transmitting a driving force to said sector gear to swingably move said fixed pivot side link, in which said link driving means includes a rotary gear and a motor for rotating said rotary gear, said motor being supported by a frame provided above said pair of cross-links and having supporting portions for supporting said frame, and in which a pair of interlocking racks parallel with each other are formed in said supporting portions and are respectively engaged with a pair of pinions concentrically provided on said supporting member.

2. A magazine loading disk player according to claim 1, in which said disk moving means includes a tray pressing member movably provided on said supporting member and adapted to engage one-by-one with said trays to press said trays out of said magazine and retract the trays into said magazine, and a tray pressing member driving means for moving said tray pressing member relative to said supporting member.

3. A magazine loading disk player according to claim 1, in which said link driving means further includes: a small-diameter belt wheel mounted on a power shaft of said motor; a large-diameter toothed belt wheel having a gear formed integrally and concentrically therewith; a toothed belt entrained between said small and large diameter belt wheels; a first double gear having a large gear portion engaged with said gear of said large-diameter toothed wheel, and having a small gear portion; and a second double gear having a large gear portion engaged with said small gear portion of said first double gear, and having a small gear portion which forms said rotary gear.

4. A magazine loading disk player according to claim 3, in which said large-diameter toothed belt wheel has a ratchet formed integrally and concentrically on a side opposite said gear; and wherein said disk player further comprises a pivotable select lever having a pawl at one end portion thereof, said pawl adapted to be engaged with and disengaged from said ratchet.

* * * * *